United States Patent
Skog et al.

(10) Patent No.: US 9,743,270 B2
(45) Date of Patent: Aug. 22, 2017

(54) PROVISIONING OF NETWORK INFORMATION INTO A SUBSCRIBER IDENTITY MODULE

(75) Inventors: Robert Skog, Hässelby (SE); Andreas Ljunggren, Vällingby (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 352 days.

(21) Appl. No.: 14/125,693

(22) PCT Filed: Jun. 23, 2011

(86) PCT No.: PCT/SE2011/050836
§ 371 (c)(1),
(2), (4) Date: Dec. 12, 2013

(87) PCT Pub. No.: WO2012/177200
PCT Pub. Date: Dec. 27, 2012

(65) Prior Publication Data
US 2014/0106713 A1    Apr. 17, 2014

(51) Int. Cl.
*H04M 3/00* (2006.01)
*H04W 8/18* (2009.01)
(Continued)

(52) U.S. Cl.
CPC .......... *H04W 8/183* (2013.01); *H04W 8/205* (2013.01); *H04W 12/04* (2013.01); *H04W 12/06* (2013.01)

(58) Field of Classification Search
None
See application file for complete search history.

(56) References Cited

U.S. PATENT DOCUMENTS

| 8,463,239 B1* | 6/2013 | Koller | H04W 8/245 455/410 |
| 2004/0054787 A1* | 3/2004 | Kjellberg | G06F 17/30905 709/228 |

(Continued)

FOREIGN PATENT DOCUMENTS

| CN | 101547437 A | 9/2009 |
| EP | 2 106 191 A1 | 9/2009 |

(Continued)

OTHER PUBLICATIONS

International Search Report, PCT Application No. PCT/SE2011/050836, Mar. 15, 2012.

(Continued)

*Primary Examiner* — Suhail Khan
(74) *Attorney, Agent, or Firm* — Sage Patent Group

(57) ABSTRACT

A method in a subscriber identity module, a subscriber identity module, a method in a user device and a user device for provisioning of network information is provided. Moreover, a method in a first network node and a first network node for managing network information is provided. The first network node receives a request for the network information, wherein the request comprises information about capabilities of the user device. Next, the first network node generates network information according to a format selected according to the capabilities of the user device. The network information is received by the user device. Next, the user device provisions the network information into the subscriber identity module.

20 Claims, 5 Drawing Sheets

(51) Int. Cl.
*H04W 8/20* (2009.01)
*H04W 12/06* (2009.01)
*H04W 12/04* (2009.01)

(56) References Cited

U.S. PATENT DOCUMENTS

| | | | |
|---|---|---|---|
| 2004/0213208 A1* | 10/2004 | Baratz | H04M 3/48 370/352 |
| 2006/0208088 A1 | 9/2006 | Sekiguchi | |
| 2009/0279701 A1* | 11/2009 | Moisand | H04L 12/185 380/270 |
| 2009/0318123 A1* | 12/2009 | Normark | H04L 41/082 455/414.4 |
| 2010/0210305 A1 | 8/2010 | Larsson | |
| 2011/0130117 A1 | 6/2011 | Fan et al. | |
| 2012/0276872 A1* | 11/2012 | Knauth | H04L 63/18 455/411 |

FOREIGN PATENT DOCUMENTS

| | | |
|---|---|---|
| EP | 2 151 972 A1 | 2/2010 |
| WO | WO 2006/087503 A1 | 8/2006 |
| WO | WO 2009/002236 A1 | 12/2008 |
| WO | WO 2011/071438 A1 | 6/2011 |

OTHER PUBLICATIONS

Written Opinion of the International Searching Authority, PCT Application No. PCT/SE2011/050836, Mar. 15, 2012.
Supplementary European Search Report, EP Application No. EP 11868295.4, Apr. 14, 2015.
Chinese Office Action for Corresponding PCT/SE2011/050836; dated Dec. 27, 2017; pp. 10; Translation Form pp. 2; Translation Summary pp. 1.

* cited by examiner

PROVISIONING OF NETWORK INFORMATION INTO A SUBSCRIBER IDENTITY MODULE

CROSS REFERENCE TO RELATED APPLICATION

This application is a 35 U.S.C. §371 national stage application of PCT International Application No. PCT/SE2011/050836, filed on 23 Jun. 2011, the disclosure and content of which is incorporated by reference herein in its entirety. The above-referenced PCT International Application was published in the English language as International Publication No. WO 2012/177200 A1 on 27 Dec. 2012.

TECHNICAL FIELD

The present disclosure relates to provisioning of network information into a subscriber identity module. More particularly, the present disclosure relates to a method in a user device and a user device for provisioning of network information into a subscriber identity module, a method in a subscriber identity module and a subscriber identity module for provisioning of network information into the subscription identity module and a method in a first network node and a first network node for managing network information.

BACKGROUND

In a cellular radio communications system, which is operated by a specific operator, a terminal, such as a cellular phone, is required to have access to information about the specific operator in order to be able to connect to the cellular radio communication system. The information about the specific operator, or operator specific information, is included in a subscription for which the user of the terminal may pay a fee.

A known way of providing operator specific information is to install a Subscriber Identity Module card (SIM card) into a terminal, where the SIM card carries the operator specific information. Normally, a SIM card manufacturer manufactures the SIM card on request from an operator. In order for the SIM cards to be specific to the operator, the operator provides the operator specific information to the SIM card manufacturer. Thereby, the SIM card manufacturer may configure the SIM card accordingly and store the operator specific information on the SIM card during manufacturing.

When a user selects a terminal and a subscription at a retailer, it is required that the retailer has a stock of SIM cards corresponding to the operators available for selection. Hence, a problem may be that the retailer needs to order SIM cards from many different operators and then keep a stock of these SIM cards.

In order to reduce handling costs for SIM cards, it has been proposed to use a so called Machine Communication Identity Module (MCIM). The MCIM is conventionally used to establish credentials of users and terminals, such as a machine-to-machine equipment (M2ME), which is described in the 3GPP document TR 33.812. Credentials are, amongst other things, used for providing encryption keys and access rights to the terminals. When the M2ME utilizes MCIM, the M2ME can initially attach to a cellular network using a standard 3GPP radio technology. Next, the M2ME receives an initial credential or authentication message and is granted an authorization for a limited set of operations by the provider of the network to which the terminal is connected. According to TR 33.812, the M2ME then uses this limited authorization, i.e. a permission to only access a Registration Operator (RO) to trigger authentication and authorization of a connection to a Selected Home Operator (SHO), who is a provider of shared secrets, authorization certificates, and services which are attached to the subscription of the user of the terminal. When granted authorisation to do so by the SHO, these shared secrets, authorisation certificates, etc. are downloaded into a secure area of the M2ME. In this manner, the shared secret and authentication certificates can be used to authenticate and authorise the M2ME as being used under a subscription provided by the SHO via the network to which it has attached. Thanks to the provision of a special infra structure including so called Registration Operators, the M2ME may connect and select the SHO.

Even though MCIM reduces the handling of SIM cards in an efficient manner, it has not yet gained wide spread use in terminals.

SUMMARY

An object is to provide an alternative solution for providing or provisioning of network information, such as operator specific information, to user devices.

According to an aspect, the object may be achieved by a method in a subscriber identity module for provisioning of network information into the subscriber identity module. The subscriber identity module is comprised in a user device. The user device comprises a transceiver for connecting to a cellular radio network. The subscriber identity module receives the network information configured into a format selected based on capabilities of the user device. The network information enables establishment of a connection between the user device and the cellular radio network. The subscriber identity module stores the network information in the subscriber identity module.

According to another aspect, the object may be achieved by a subscriber identity module configured for provisioning of network information into the subscriber identity module. The subscriber identity module is configured to be comprised in a user device. The user device comprises a transceiver for connecting to a cellular radio network. The subscriber identity module comprises an input unit configured to receive network information configured into a format selected based on capabilities of the user device. The network information is configured to enable establishment of a connection between the user device and the cellular radio network. Furthermore, the subscriber identity module comprises a processing circuit configured to store the network information in the subscriber identity module.

According to a further aspect, the object may be achieved by a method in a user device for provisioning of network information into a subscriber identity module comprised in the user device. The user device comprises a transceiver for connecting to a cellular radio network. The user device receives network information configured into a format selected based on capabilities of the user device. The network information enables establishment of a connection between the user device and the cellular radio network. The user device provisions the received network information into the user device.

According to yet another aspect, the object may be achieved by a user device for provisioning of network information into a subscriber identity module. The subscriber identity module is configured to be included in the user device. The user device comprises an arrangement configured to receive network information configured into a format selected based on capabilities of the user device. The network information is configured to enable establishment of a connection between the user device and the cellular radio network. Furthermore, the user device comprises a transceiver configurable for connection to the cellular radio network. The user device further comprises a processing circuit configured to provision the network information into the user device.

According to a still further aspect, the object may be achieved by a method in a first network node for managing network information. The first network node receives a request for the network information from a second network node. The request comprises information about capabilities of a user device to which the network information is to be applied. The first network node selects a format of the network information to be generated, which format is adapted to the capabilities of the user device. The network information enables the user device to establish a connection to a cellular radio network. The first network node generates the network information according to the selected format. Next, the first network node provides the network information to the user device.

According to still another aspect, the object may be achieved by a first network node for managing network information. The first network node comprises a receiving unit for configured to receive a request for the network information from a second network node. The request comprises information about capabilities of a user device to which the network information is to be applied. Moreover, the first network node comprises a processing circuit configured to select a format of the network information to be generated, which format is adapted to the capabilities of the user device. The network information is configured to enable the user device to establish a connection to a cellular radio network. The processing circuit further is configured to generate the network information according to the selected format and provide the network information to the user device.

Generally, the present disclosure presents a solution for provisioning of network information. The first network node receives a request for the network information. The request comprises information about capabilities of the user device for which a subscription shall apply. As an example, the subscription may have been ordered via the Internet, in a retail shop or the like, by a user of the user device. The capabilities of the user device may indicate that the user device is equipped with a camera, an RFID reader, a light sensor or the like.

Next, the first network node generates network information in a format which matches the capabilities of the user device. As a next action, the network information is provided to the user device. The user device receives the network information provided by the first network node. The network information may be received in many different manners as is disclosed herein. The manners in which the network information may be received may imply that the network information is configured according to capabilities of the user device. A few examples are that the network information may be received in the form of a text string via for example a key pad of the user device, in the form of a sticker comprising an RFID tag via an RFID reader of the user device, the network information being encoded into the RFID tag, or in the form of an image of a barcode encoding the network information via a light sensor, such as a camera. In any of these manners, and other manners as disclosed herein, the network information may be received without connecting to the cellular radio network.

Next, the user device provisions the network information into the subscriber identity module.

In this manner, an alternative solution for provisioning of network information into the subscriber identity module is provided. Thus, the above mentioned object is achieved.

Advantageously, a delivery to a retailer of a physical SIM card comprising information about the operator and/or network is not required. Hence, distribution of SIM cards becomes cost efficient because the same physical SIM card may be used by many different operators.

Another advantage may be that the subscriber identity module is configured for a specific operator in response to an order of a subscription with the specific operator. Expressed differently, the subscriber identity module is bound to the specific operator as a result of an action, such as an order of a subscription, of an end user. In contrast, SIM cards according to prior art are bound to the operator at manufacturing.

A further advantage may be that the subscriber identity module and/or the user device may be configured to be capable of connecting to a cellular radio network by a user of the user device. Thus, the subscriber identity module may be configured dynamically.

Moreover, according to some embodiments, an advantage is that the network information may be obtained quickly and electronically.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
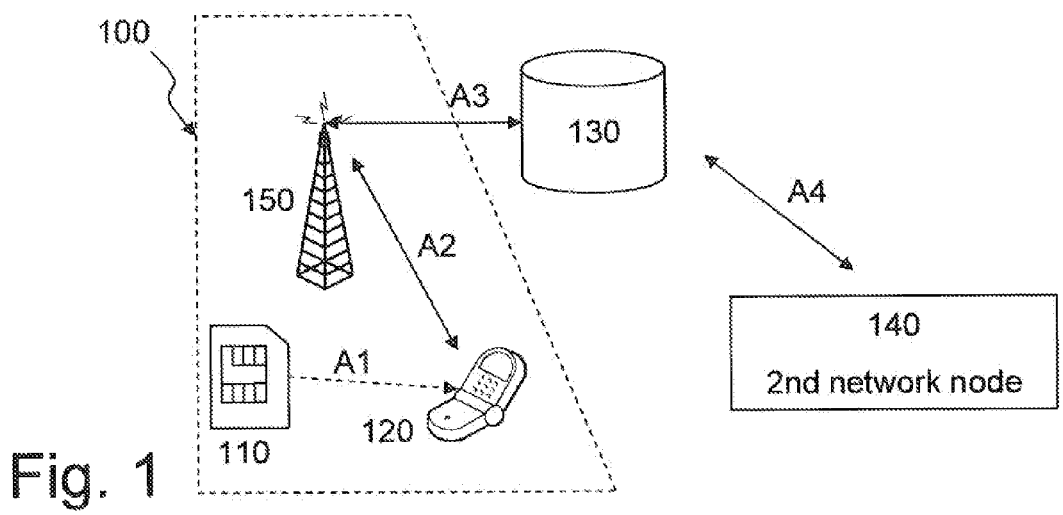
FIG. 1 shows a schematic overview of an exemplifying radio communication system in which exemplifying methods according embodiments herein may be implemented.

Throughout the following description similar reference numerals have been used to denote similar elements, network nodes, parts, items, actions or features, when applicable. In the Figures, features that appear in some embodiments are indicated by dashed lines.

FIG. 1 shows an exemplifying radio communication system 100, in which exemplifying methods according to embodiments herein may be implemented. The radio communication system 100 comprises a radio network node 150 and a user device 120 according to embodiments herein.

The radio communication system 100 may be any kind of cellular radio communication system including but not limited to a Long Term Evolution (LTE) system, a Universal Mobile Telecommunications system (UMTS), a 3rd Generation Partnership Project (3GPP) Wideband Code Division Multiple Access (WCDMA) system, a Global System for Mobile communications/Enhanced Data rate for GSM Evolution (GSM/EDGE) system, Worldwide Interoperability for Microwave Access (WiMax) system, or Ultra Mobile Broadband (UMB) system. The radio communication system 100 may be a cellular radio network 100.

As used herein, a user device may be a mobile phone, a cellular phone, a Personal Digital Assistant (PDA) equipped with radio communication capabilities, a terminal, a user equipment, a smart phone, a laptop equipped with an internal or external mobile broadband modem, a portable electronic radio communication device, a fridge equipped with radio communication capabilities, a watch equipped with radio communication capabilities, a refrigerator or freezer equipped with radio communication capabilities, a sensor device equipped with radio communication capabilities or the like. A sensor device may be a thermometer, a barometer, a hydrometer, a light sensor, a camera, a Global Positioning System (GPS) unit or the like. It shall be understood that radio communication capabilities means that the user device comprises a radio transceiver for connection to a radio network, in particular to a cellular radio network, such as a telecommunication network.

The radio network node 150 may be a radio base station, an evolved-NodeB, a femto base station, a NodeB or the like depending on the radio communication system. That is, if the radio communication system is for example a Long Term Evolution system, the radio network node 150 may be an evolved-NodeB.

A first network node 130 is configured to manage network information. As an example, the first network node 130 may be a Home Subscription System (HSS), a Home Location Register (HLR) or the like. In some embodiments, the first network node 130 further is configured to manage subscription information.

In some embodiments, the network information comprises one or more of:
a value for identification of International Mobile Subscriber Identity (IMSI),
a name of an operator managing the cellular radio network 100,
a key to be used for connecting to the cellular radio network 100,
a network identifier for identifying the cellular radio network 100, and
the like.

As an example, the network information may comprise IMSI: 46768123123, NET: <a name of an operator>, KEY: F13E781CD947, NETID:189.

As another example, the network information may comprise:
an IMSI number (E.212),
a cryptographic key that ties the network information to the cellular radio network 100 as an example of the key above. The IMSI comprises a Mobile Country Code (MCC), a Mobile Network Code (MNC), a Mobile Station Identification Number (MSIN). The MCC, the MNC and the MSIN may be represented by 15 digits where MCC is represented by 3 digits, MNC by 2-3 digits and MSIN by 9-10 digits.

It may be noted that it is enough that the network information enables the user device to securely connect to the first network node 130. The first network node 130 may be associated to the operator. Thus, in some examples, the network information comprises a password and/or a username. The username and/or password may be associated to a subscription selected by a user. Hence, the first network node 130 may determine network information based on the subscription (and the capabilities of the user device 120 as will be explained below). The network information is provided to the user device 120.

In some embodiments, the key to be used for connecting to the cellular radio network 100 is used only once. In other words, the first network node may need to keep track of whether the key has been used before or not. In this manner, it is assured that the network information is only utilized once and by one user device. In examples, where the key is used only once, it may be preferred to provide one or more further encryption keys by providing the subscription information which may comprise further such keys, i.e. further encryption keys. The further keys for connecting to the cellular radio network 100 may be provided in addition to or as replacement of the initially provided key, such as the key that may be used only once, or password in order to further manage authentication, such as validity, of the user device 120.

It shall here also be noted that the name of the operator managing the cellular radio network 100 may specify any commercial operator which provides subscriptions for use by end-users.

In some embodiments, the subscription information may comprise one or more of:
a part or all of the network information,
a phone number to a Short Message Service Centre,
a server name for email functions,
a roaming list,
one or more further encryption keys,
an Access Point Name (APN),
information about entries in an address book, i.e. phone numbers and a text reference associated thereto, and
the like.

The present disclosure relates to how to provision the network information into the user device 120. Some embodiments herein further disclose how to provision the subscription information into the user device 120.

Figure 2:
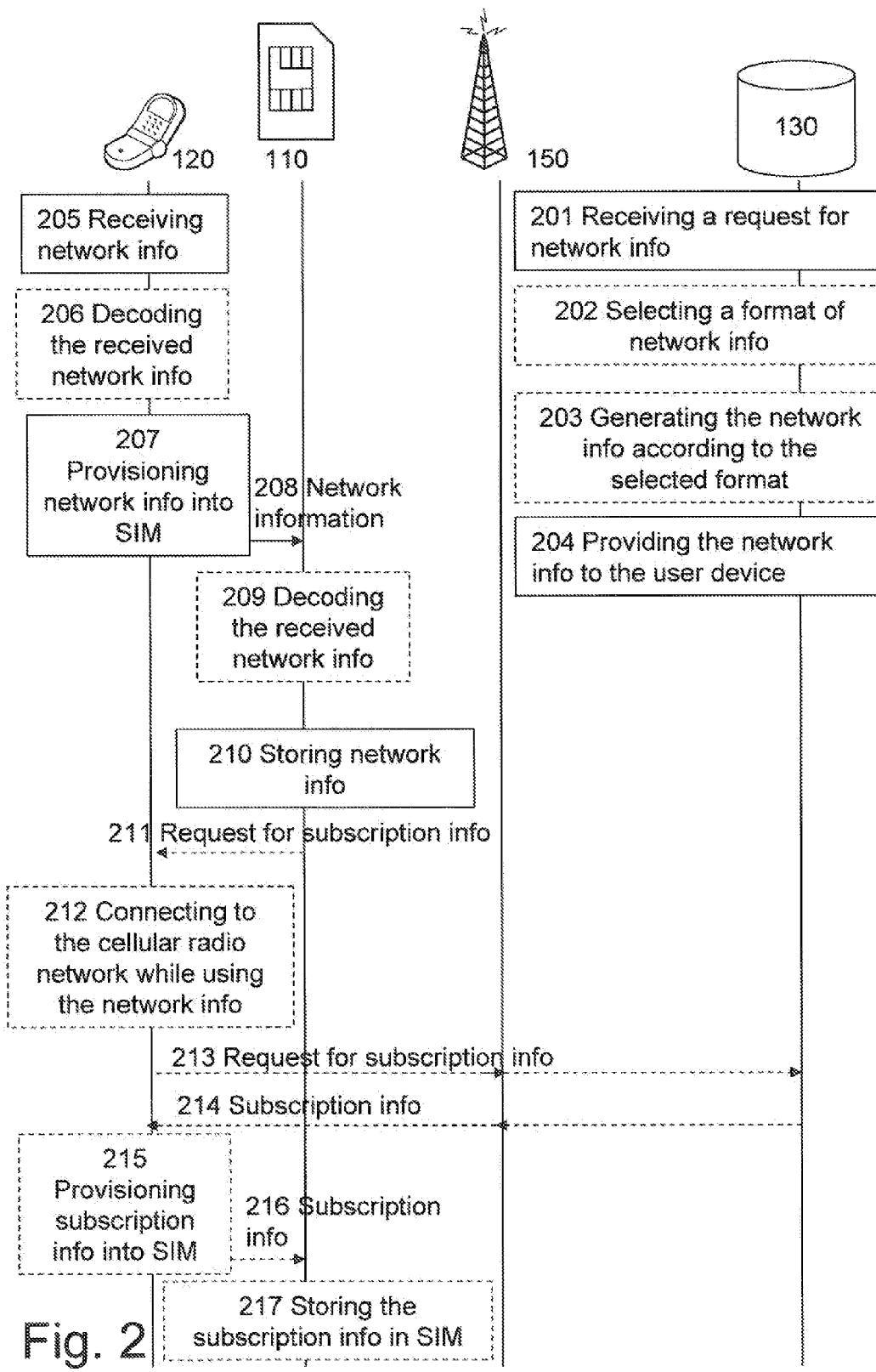
FIG. 2 shows a schematic, combined signalling and flow chart of the exemplifying methods in the radio communication system according to FIG. 1.

Now with reference to FIG. 2, a combined signalling and flow chart of exemplifying methods in the user device 120, the subscriber identity module 110, and the first network node 130 is shown. In FIG. 2, a radio network node 150, such as a radio base station, is also shown. The radio network node 150 forwards information to the user device 120 from the network node 130 and vice versa. The user device 120 comprises a transceiver, such as a radio transceiver, for connecting to the cellular radio network 100. The subscriber identity module 110 may perform a method for provisioning of network information into the subscriber identity module 110, which is comprised in the user device 120. The user device 120 may perform a method for provisioning of network information into a subscriber identity module 110 comprised in the user device 120. The first network node 130 may perform a method for managing network information.

In advance of executing the method below, an order for a subscription in the cellular radio network 100 has been effectuated for the user device 120. Typically, at a retailer a customer, or a user of the user device 120, buys a subscription for a cellular radio network operated by a certain operator. The use may possibly be a person working for the retailer. The order of the subscription may be made via the internet, via a phone call, an email, a letter or the like. The operator may manage network information in the first network node 130. It may be that the user selects a new subscription for a user device that has been obtained, such as purchased, previously or the user also selects a new user device at the retailer.

The following actions, such as steps, may be performed. Notably, in some embodiments of the methods the order of the actions may differ from what is indicated below.

Action 201

The first network node 130 receives a request for network information, denoted network info in the Figure. The request may be received from a second network node 140. The second network node 140 may receive and/or handle an order for a subscription, or requests for network information.

As an example, the second network node 140 may forward the order, i.e. information about the order, received from a form of a browser, an email, a telephone call, a letter or the like. The request comprises information about capabilities of the user device 120 to which the network information is to be applied. Exemplifying capabilities of the user device 120 may be that the user device 120 comprises, or may be connected to, a camera, an RFID reader, a light sensor, a radio signal transceiver adapted for Bluetooth, Near Field Communication (NFC), etc and other arrangements for receiving the network information. The second network node 140 may be any kind of user terminal which may be used for ordering the subscription from the operator of the first network node 130. The user terminal may be a computer, a cellular phone, a phone, a smartphone, a Personal Digital Assistant (PDA) or any other device by means of which a user may order a subscription. In other examples, the second network node 140 may be an automated scanner for scanning a letter comprising the request for network information. When the letter has been scanned, the second network node 140 sends the request to the first network node 130. In other scenarios, the letter may be handled manually and the request for network information is generated based on input from a person handling the letters. In such scenario, the second network node may be a computer, such as a client computer, a personal computer or the like.

Action 202

The first network node 130 selects a format of the network information, denoted network info in the Figure, to be generated, which format is adapted to the capabilities of the user device 120. The network information enables the user device 120 to connect to the first network node 130.

In some examples, the network information relates to the cellular radio network 100. In this manner, the user device 120 may be configured to be able to connect to the cellular radio network 100.

As an example, the selected format may be an image, a radio signal or a light signal depending on the capabilities indicated by the information about capabilities comprised in the request. For example, the capability may indicate that the user device comprises one or more of an image sensor, an RFID reader, a keypad or the like. When the user device 120 comprises an image sensor, such as a camera, it may be preferred that the selected format is an image. Likewise when the user device 120 comprises an RFID reader, it may be preferred that the selected format is a RFID tag, which may generate a specific radio signal comprising the network information.

Action 203

The first network node 130 generates the network information according to the selected format.

As an example, if the selected format is an image, a radio signal and/or a light signal, then the generating of the network information comprises encoding the network information into the image, the radio signal and/or the light signal.

In some embodiments of the method, the generated network information is to be input into the user device 120 via a tactile input device, such as keypad, comprised in the user device 120.

Action 204

The first network node 130 provides the network information to the user device 120.

As an example, the generated network information may be sent in the form of a letter to the user of the user device 120. The letter may comprise a sticker with a barcode, an RFID tag, QR code or the like.

As another example, the generated network information may be sent to a further device. For example, the further device may be a computer. When the further device is a computer, depending on the format of the network information one or more of the following scenarios may be realized.

When the generated network information comprises an image, the image may be printed, or displayed on a screen of the computer, and then the user device 120 may capture the image by means of an image sensor, such as a camera, connected to the user device. As an example, the image sensor may be comprised in the user device 120.

When the generated network information is comprised in a Bluetooth command, the Bluetooth command may be sent from, for example, the second network node 140, such as a computer, to the user device via Bluetooth. In other examples, the Bluetooth command or the like is sent from a cellular phone, specified in the order. For example, the cellular phone may be owned by a friend or the like. The Bluetooth command may also be sent from another device that may have received the Bluetooth command via internet or the cellular radio network 100.

Action 205

The user device 120 receives network information configured into a format selected based on capabilities of the user device. Expressed differently, it may be preferred that the network information is received in a format that is adapted to capabilities of the user device 120. It is to be understood that the network information has been generated by the operator, i.e. the first network node 130, as is explained in action 203. The network information enables establishment of a connection between the user device 120 and the cellular radio network 100. In this manner, the network information may be received without connecting to the cellular radio network 100. As an example, the network information is related to the cellular radio network 100.

In some embodiments, the user device 120 may access the cellular radio network 100 after the network information is received. As an example, the network information provides all information required for the subscription ordered by for example the user of the user device 120.

As another example, the network information does not provide all information required for the subscription ordered by for example the user of the user device 120. In such example, the subscription information provides information required for the subscription ordered.

Notably, in some embodiments, the user device 120 may not access the cellular radio network 100 until the subscription information is received. In such embodiment, the subscription information may be received via WLAN or the like as explained herein. See action 214.

As an example, the network information may be basic subscription information with limited validity and/or limited functionality. In other words, the basic subscription information is basic in that the validity and/or functionality thereof is/are limited. For example, the basic subscription information may be limited to only voice calls, allow or not allow roaming, a maximum up/downlink rate and/or a maximum number of bytes per month (or day etc). Moreover, only a limited number of minutes for the voice calls may be available. The network information enables the user device 120 to connect to the first network node 130, such as an operator providing subscriptions to be used by end-users. Thereby, infrastructure needed for provision of network information and/or subscription information is kept simple. For example, registration operators according to prior art are not required. Moreover, thanks to that the subscriber identity module 110 need not be provided with any network and/or operator specific information at manufacturing, embodiments herein provide flexible methods for provisioning of network information and/or subscription information. Preferably, the user device 120 connects to the first network node 130 while using the network information. See action 212.

In some embodiments, the received network information is received from a tactile input device, such as a key pad, a keyboard or a touch-screen. As an example, a user of the user device 120 may input the network information into the user device 120 by means of a key pad.

In some embodiments, the tactile input device may be comprised in the user device 120. As an example, the tactile input device may be a key pad built into the user device 120.

In some embodiments, the tactile input device may be external to the user device 120. As an example, the user device 120 may be able to connect to a keyboard while utilizing Bluetooth (BT). This is related to embodiments in which the network information is received as a Bluetooth command. It is also contemplated that a camera or the like may connect to the user device 120 via Bluetooth. See action 206.

In some embodiments, the user device 120 may need a hardware reset in order to put the user device into a special mode, or state, in which the network information and/or the subscription information may be provisioned into the subscriber identity module 110. In this manner, the user device 120 need to perform processing to check whether provisioning of network information and or subscription information is to be performed. In particular, when the user device 120 and the subscriber identity module 110 are to be updated with a new subscription, it may be preferred to allow such update when the user device 120 is put in the special mode. Action 206

In some embodiments, the received network information is encoded into an image. Then, the user device 120 decodes the image to obtain the network information. The image may comprise at least one of a barcode, a 1-dimensional barcode and a 2-dimensional barcode, such as a Quick Response (QR) code or the like. In some examples, the images may be a three dimensional image, such as a hologram. As an example, the user device 120 may capture the image with a built-in image sensor, such as a camera. In other examples, the image sensor may be connected to the user device 120 while utilizing Bluetooth or another equivalent technology for connection of devices.

In some embodiments, the received network information is encoded into a radio signal. Then, the user device 120 decodes the radio signal to obtain the network information. The radio signal may be a Near Field Communication command, a Bluetooth command or a signal comprising information from a Radio Frequency Identification tag (RFID tag). In addition, the radio signal may be a radio signal in a WLAN. Expressed differently, the radio signal may be received via WLAN.

In some embodiments, the received network information is encoded into a light signal. Then, the user device 120 decodes the light signal to obtain the network information. The light signal may comprise flashes for indicating the network information. In other examples, different wavelengths of light may be used when encoding the network information into the light signal. In some user devices, such as a television set, a fridge, a watch or the like, the light signal may be received by an ambient light sensor. This scenario relates to any user device being equipped with an ambient light sensor or the like. The ambient light sensor may be used for adjusting properties, such as intensity, contrast or the like, of a display comprised in the user device. By use of the ambient light sensor of such user device, network information may be input, such as entered into the user device 120, in a convenient manner. Moreover, the received light signal may be an Infrared (IR) light signal. As an example, a standard according to the Infrared Data Association (IrDA) may be used for the transmission of the IR light signal.

In some embodiments, the received network information is encoded into a combination of two or more of the image, the radio signal, the light signal.

As yet another example, a first portion of the network information may be encoded into an image, a radio signal and/or a light signal and a second portion of the network information may be received from the tactile input device. In this manner, a user of the user device 120 may first input a code or the like on the tactile input device and then use a camera or the like of the user device 120 to read for example a barcode. As a result, the network information is input into the user device 120.

It shall be understood that further examples of combinations for encoding and receiving the network information are contemplated.

Action 207

When the user device 120 has received and in some embodiments also decoded the network information, the user device 120 provisions the network information into the user device 120. As an example, the user device 120 configures and stores the network information in a memory of the user device 120. As an example, the memory is secure in order to prevent unauthorized use of the network information. The memory may be a flash memory, a random access memory or other memory within the user device 120. It may be particularly useful to configure and store the network information on the subscriber identity module 110, i.e. on a memory portion of the subscriber identity module 110. Then, the user device 120 may interact with the subscriber identity module 110 for receiving the subscription information when connecting to the cellular radio network.

Action 208

The subscriber identity module 110 receives the network information. As an example, the network information is received by the subscriber identity module 110 when the user device 120 provisions the subscriber identity module 110 with the network information. As mentioned above, the network information relates to the cellular radio network 100 and enables establishment of a connection between the user device 120 and the cellular radio network 100. Also as mentioned above, the format of the network information is adapted to the capabilities of the user device 120.

It may be noted that the network information is received by the subscriber identity module 110 without a connection between the user device 120 and the cellular radio network 100.

Action 209

In some embodiments, the received network information is encoded into an image, a radio signal and/or a light signal as explained in conjunction with action 203. Then, the subscriber identity module 110 decodes the image, the radio signal and/or the light signal to obtain the network information.

As an example, if the user device 120 decodes the image to obtain the network information which then is provisioned into the subscriber identity module 110, the subscriber identity module 110 need not decode the image to obtain the network information. In this manner, data of the image, i.e. in a format such as bitmap, jpg, gif or the like need not be transferred to the subscriber identity module 110. Instead a sequence of characters, such as digits and/or letters, are transferred to the subscriber identity module 110. The sequence may need to be decoded by the subscriber identity module 110 to obtain the network information. Similarly, if the user device 120 does not decode the image with the encoded network information, the subscriber identity module 110 receives in action 208 the image with the encoded network information. Thus, the subscriber identity module 110 decodes the image to obtain the network information in action 209. In case the image is a barcode, the decoding of the image may result in a sequence of characters as mentioned above. The sequence may need further decoding.

Action 210

The subscriber identity module 110 stores the network information in the subscriber identity module 110. As an example, the subscriber identity module 110 may store the network information in a memory portion of the subscriber identity module 110. Contrary to storing in the memory portion of the subscriber identity module 110, the subscriber identity module 110 may store the network information in the user device 120 in some other examples. For example, a memory of the user device 120 may be used for storing of the network information. It is preferred that the memory of the user device 120 is secure in that unauthorized reading of the network information is prevented.

Action 211

In some embodiments, the subscriber identity module 110 sends and the user device 120 receives a request for the subscription information. The subscriber identity module 110 may send the request for the subscription information to the first network node 130 managing subscription information via the user device 120.

According to some embodiments, the user device 120 may need to restart, such as reset by powering down and powering up, before requesting the subscription information.

Action 212

In some embodiments, the user device 120 connects to the first network node 130 while using the received network information. In this manner, the user device 120 establishes a connection with the first network node 130. The connection may be performed via the cellular radio network 100, Bluetooth, WLAN or the like. By connecting to the first network node 130, the user device 120 may receive subscription information as is explained with reference to for example action 214. Since range of the cellular network usually is greater than range of BT and/or WLAN, it may in some embodiments be preferred to connect to the first network node 130 via the cellular network 100.

It may be that the key to be used for connecting to the cellular radio network 100 is used for authenticating the connection to the first network node 130. For example, it may be that the key may be used only once, such as to for example prevent fraud.

As mentioned above, the user device 120 may receive the subscription information via any available wireless access technology, such as Wireless Local Area Network (WLAN), Bluetooth, Wireless Fidelity (WiFi) or the like. In such scenario, the received network information enables connection to the first network node 130 such as by providing encryption keys, username or the like, which are needed for access to the first network node 130.

Action 213

In some embodiments, the user device 120 may send and the first network node 130 may receive the request for the subscription information. The request may be sent and received via the cellular radio network 100, WLAN, WiFi, Bluetooth or the like. The request may be implicit, i.e. if the first network node 130 concludes that the network information used for connecting to the first network node 130, see action 212, is used for the first time, the first network node 130 may interpret the connection as an implicit request for subscription information.

Action 214

In some embodiments, the first network node 130 sends and the user device 120 receives the subscription information. The subscription information may be sent and received via the cellular radio network 100, WLAN, WiFi, Bluetooth or the like.

In some embodiments, it may be that from this point and onward encryption keys comprised in the subscription information are used instead of, or in addition to, the encryption keys comprised in the network information.

Action 215

In some embodiments, the user device 120 provisions the subscription information into the subscriber identity module 110. Expressed differently, the user device 120 configures and stores the subscription information in the subscriber identity module 110. In more detail, the subscription information may be stored in the memory portion of the subscriber identity module 110.

Action 216

In some embodiments, the subscriber identity module 110 receives the subscription information from the first network node 130 via the user device 120.

Action 217

In some embodiments, the subscriber identity module 110 stores the subscription information in the subscriber identity module 110, thereby provisioning the subscription information into the subscriber identity module. As an example, the subscription information is stored in the memory portion of the subscriber identity module 110.

Figure 3:
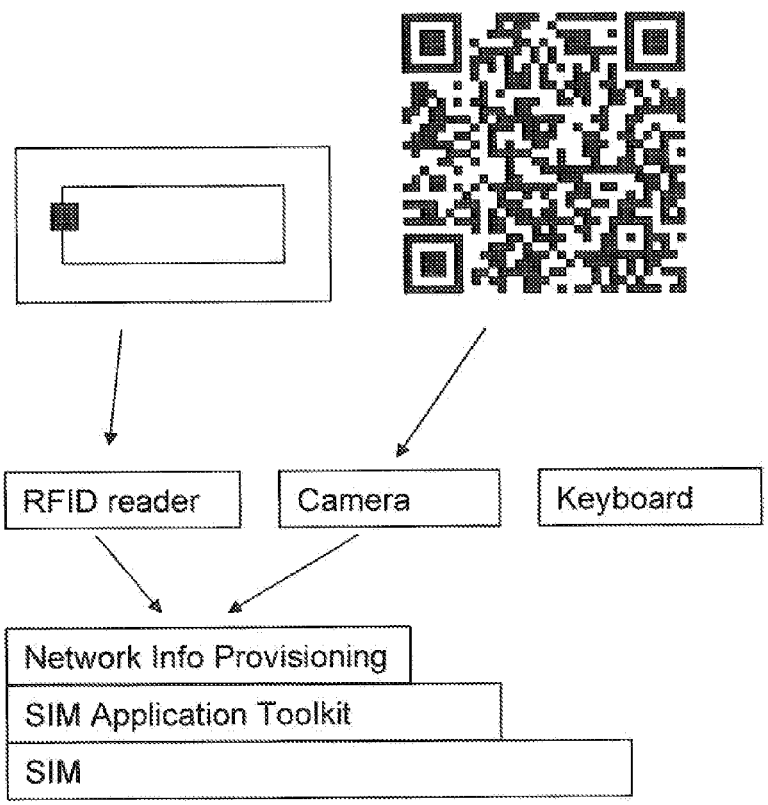
FIG. 3 shows an exemplifying block diagram relating to a SIM application toolkit.

In FIG. 3, an exemplifying block diagram relating to a SIM application toolkit is shown. According to embodiments herein the SIM application toolkit comprises functionality for provisioning of network information. In this manner, an application running on the subscriber identity module may request the network information from the user of the user device 120. As a first simple example, the application running of the subscriber identity module requests the user to input the network information via a tactile input device comprised in the user device. Typically, the user inputs the network information via a key pad or a virtual key pad/board on a touch screen.

In some embodiments, the SIM application tool kit comprises functionality for activating an arrangement for receiving the network information. The arrangement may be an image sensor, a light sensor, a radio receiver, an RFID reader or the like. In this manner, the network information may be provisioned into the subscriber identity module by reading of an image, such as a barcode, by receiving a light signal, such as flashes, by receiving a radio signal, such as a Bluetooth command or the like.

In some embodiments, the subscriber identity module further is provided with functionality for decoding network information from an image, a radio signal, a light signal or the like in order to handle the manners in which the network information may be received. These manners have been described above with reference to action 206 and 209. The functionality may be installed onto the subscriber identity module in the form of standalone applications. However, in some embodiments, the functionality for decoding network information is comprised the SIM application toolkit.

Figure 4:
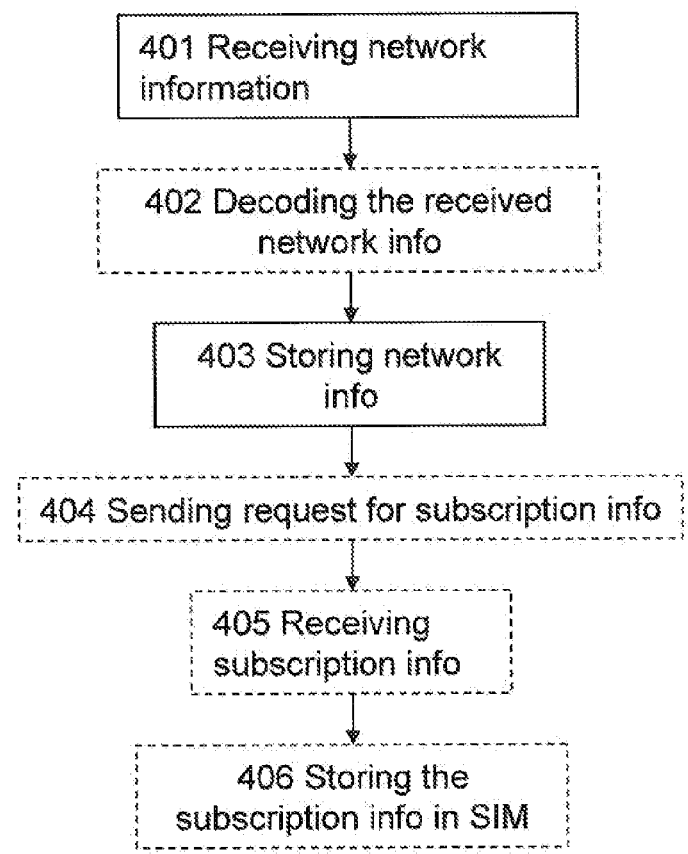
FIG. 4 shows a schematic flow chart of the methods of FIG. 2 when seen from the subscriber identity module.

In FIG. 4, an exemplifying, schematic flow chart of the method of FIG. 2 when seen from the subscriber identity module 110 is shown. As mentioned above, the subscriber identity module 110 may perform a method for provisioning of subscription information into the subscriber identity module 110. Also as mentioned above, the subscriber identity module 110 is comprised in the user device 120 and the user device 120 comprises a transceiver for connecting to the cellular radio network 100.

The following actions, such as steps, may be performed. Notably, in some embodiments of the methods the order of the actions may differ from what is indicated below.

Action 401

This action corresponds to action 208.

The subscriber identity module 110 receives the network information. As an example, the network information is received by the subscriber identity module 110 when the user device 120 provisions the subscriber identity module 110 with the network information. As mentioned above, the network information relates to the cellular radio network 100 and enables establishment of a connection between the user device 120 and the cellular radio network 100. Also as mentioned above, the format of the network information is adapted to the capabilities of the user device 120.

It may be noted that the network information is received by the subscriber identity module 110 without a connection between the user device 120 and the cellular radio network 100.

Action 402

This action corresponds to action 209.

In some embodiments, the received network information is encoded into an image, a radio signal and/or a light signal as explained in conjunction with action 203. Then, the subscriber identity module 110 decodes the image, the radio signal and/or the light signal to obtain the network information.

As an example, if the user device 120 decodes the image to obtain the network information which then is provisioned into the subscriber identity module 110, the subscriber identity module 110 need not decode the image to obtain the network information. In this manner, data of the image, i.e. in a format such as bitmap, jpg, gif or the like need not be transferred to the subscriber identity module 110. Instead a sequence of characters, such as digits and/or letters, are transferred to the subscriber identity module 110. The sequence may need to be decoded by the subscriber identity module 110 to obtain the network information. Similarly, if the user device 120 does not decode the image with the encoded network information, the subscriber identity module 110 receives in action 401 the image with the encoded network information. Thus, the subscriber identity module 110 decodes the image to obtain the network information in action 402, i.e. the present action. In case the image is a barcode, the decoding of the image may result in a sequence of characters as mentioned above. The sequence may need further decoding.

Action 403

This action corresponds to action 210.

The subscriber identity module 110 stores the network information in the subscriber identity module 110. As an example, the subscriber identity module 110 may store the network information in a memory portion of the subscriber identity module 110. Contrary to storing in the memory portion of the subscriber identity module 110, the subscriber identity module 110 may store the network information in the user device 120 in some other examples. For example, a memory of the user device 120 may be used for storing of the network information. It is preferred that the memory of the user device 120 is secure in that unauthorized reading of the network information is prevented.

Action 404

This action corresponds to action 211.

In some embodiments, the subscriber identity module 110 sends and the user device 120 receives a request for the subscription information. The subscriber identity module 110 may send the request for the subscription information to the first network node 130 managing subscription information via the user device 120.

According to some embodiments, the user device 120 may need to restart, such as reset by powering down and powering up, before requesting the subscription information.

Action 405

This action corresponds to action 216.

In some embodiments, the subscriber identity module 110 receives the subscription information from the first network node 130 via the user device 120.

Action 406

This action corresponds to action 217.

In some embodiments, the subscriber identity module 110 stores the subscription information in the subscriber identity module 110, thereby provisioning the subscription information into the subscriber identity module. As an example, the subscription information is stored in the memory portion of the subscriber identity module 110.

Figure 5:
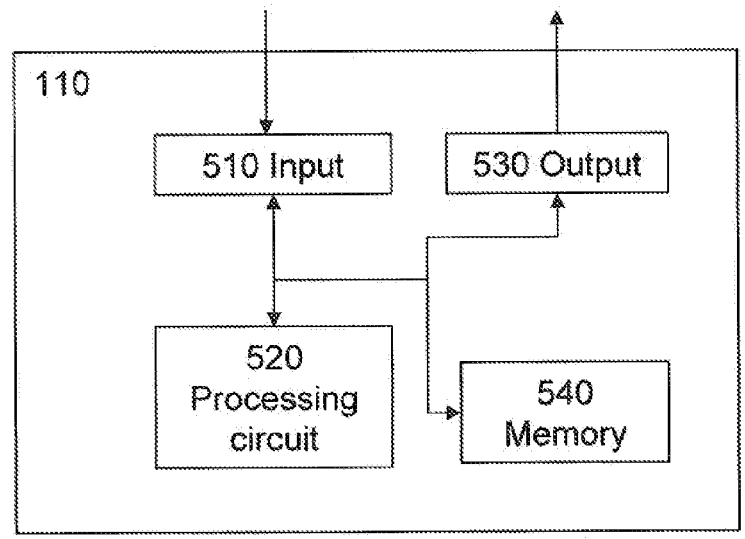
FIG. 5 shows a schematic block diagram of an exemplifying subscriber identity module configured to perform the methods illustrated in FIG. 4.

With reference to FIG. 5, there is shown a schematic block diagram of the subscriber identity module 110 configured to perform the actions above for provisioning of network information into the subscriber identity module 110. As mentioned above, the subscriber identity module 110 is configured to be comprised in a user device 120, and the user device 120 comprises a transceiver for connecting to the cellular radio network 100.

The subscriber identity module 110 comprises an input unit 510 configured to receive network information configured into a format selected based on capabilities of the user device 120. As mentioned above, the network information is configured to enable establishment of a connection between the user device 120 and the cellular radio network 100.

In some embodiments, the input unit 510 further is configured to receive subscription information from the first network node 130 via the user device 120.

Furthermore, the subscriber identity module 110 comprises a processing circuit 520 configured to store the network information in the subscriber identity module 110.

In some embodiments, the processing circuit 520 further is configured to store the subscription information in the subscriber identity module 110.

In some embodiments, the format into which the network information is configured is an image and the processing circuit 520 further is configured to decode the image to obtain the network information. As an example, the user device 120 comprises an image sensor for receiving, or capturing, the image.

In some embodiments, the image comprises at least one of:
a barcode,
a 1-dimensional barcode,
a 2-dimensional barcode,
a QR code, and
the like.

In some embodiments of the subscriber identity module 110, the format into which the network information is configured is a radio signal and the processing circuit 520 further is configured to decode the radio signal to obtain the network information. As an example, the user device 120 comprises a radio receiver for receiving the radio signal. The radio receiver may be an RFID reader, a BT transceiver or the like. The radio signal may be a Near Field Communication (NFC) command, a Bluetooth command or information from a RFID tag.

In some embodiments of the subscriber identity module 110, the format into which the network information is configured is a light signal and the processing circuit 520 further is configured to decode the light signal to obtain the network information. As an example, the user device 120 comprises a light sensor, such as an image sensor, ambient light sensor or the like.

In some embodiments of the subscriber identity module 110, the processing circuit 520 further is configured to receive the network information from a tactile input device comprised in the user device 120.

The processing circuit 520 may be a processing unit, a processor, an application specific integrated circuit (ASIC), a field-programmable gate array (FPGA) or the like. As an example, a processor, an ASIC, an FPGA or the like may comprise one or more processor kernels.

In some embodiments, the subscriber identity module 110 comprises an output unit 530 configured to send a request for the subscription information to the first network node 130 managing subscription information via the user device 120.

In some embodiments, the subscriber identity module 110 may further comprise a memory 540 for storing software to be executed by, for example, the processing circuit. The software may comprise instructions to enable the processing circuit to perform the method in the subscriber identity module 110 as described above in conjunction with FIG. 4. The memory 540 may be a hard disk, a magnetic storage medium, a portable computer diskette or disc, flash memory, random access memory (RAM) or the like. Furthermore, the memory may be an internal register memory of a processor. Moreover, the memory 540 may be used for storing the network information and/or the subscription information.

The processing circuit, the input unit, the output unit and the memory may be electrically coupled to each other.

In some embodiments of the subscriber identity module 110, the network information comprises one or more of:
a value for identification of International Mobile Subscriber Identity, IMSI,
a name of an operator managing the cellular radio network 100,
a key to be used for connecting to the cellular radio network 100,
a network identifier for identifying the cellular radio network 100, and
the like.

In some embodiments of the subscriber identity module 110, the subscriber identity module 110 is a subscriber identity module card, aka a SIM card, being adapted to be removably insertable into the user device 120.

In some embodiments of the subscriber identity module 110, the subscriber identity module 110 is configured to be soldered onto a chip comprised in the user device 120.

Figure 6:
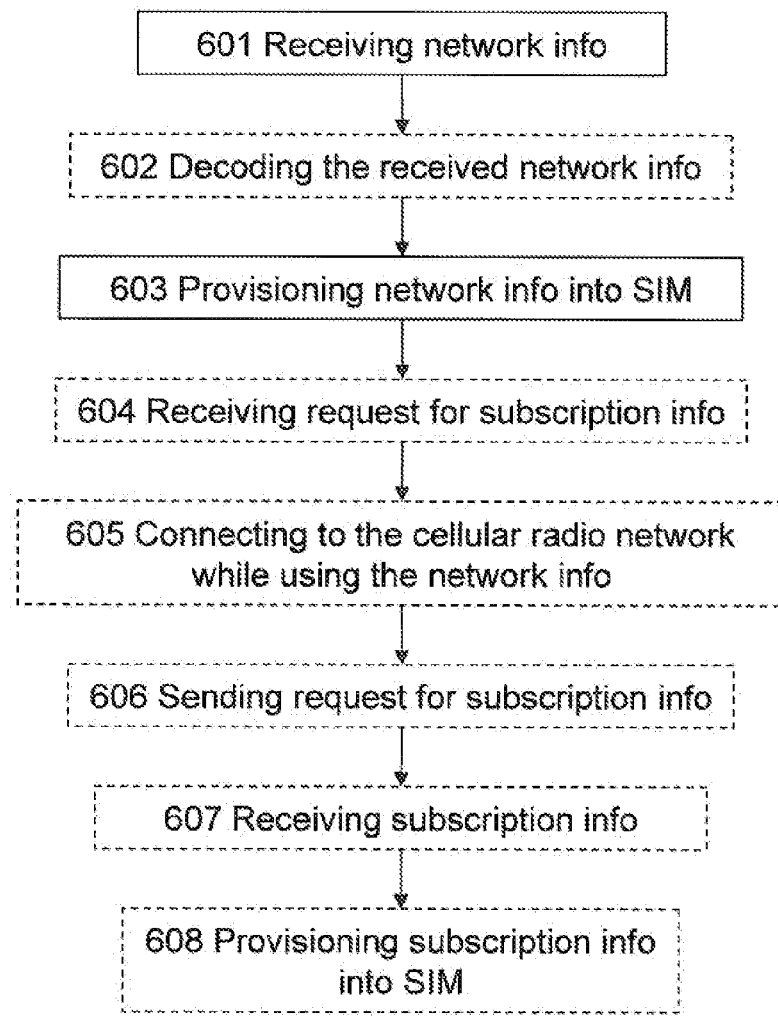
FIG. 6 shows a schematic flow chart of the methods of FIG. 2 when seen from the user device.

In FIG. 6, an exemplifying, schematic flow chart of the methods of FIG. 2 when seen from the user device 120 is shown. As mentioned above, the user device 120 may perform a method for provisioning of subscription information into the subscriber identity module 110. Also as mentioned above, the subscriber identity module 110 is comprised in the user device 120, and the user device 120 comprises a transceiver for connecting to the cellular radio network 100.

The following actions, such as steps, may be performed. Notably, in some embodiments of the methods the order of the actions may differ from what is indicated below.

Action 601

This action corresponds to action 205.

The user device 120 receives network information configured into a format selected based on capabilities of the user device. Expressed differently, it may be preferred that the network information is received in a format that is adapted to capabilities of the user device 120. It is to be understood that the network information has been generated by the operator, i.e. the first network node 130, as is explained in action 203. The network information enables establishment of a connection between the user device 120 and the cellular radio network 100. In this manner, the network information may be received without connecting to the cellular radio network 100.

In some embodiments, the user device 120 may access the cellular radio network 100 after the network information is received. As an example, the network information provides all information required for the subscription ordered by for example the user of the user device 120.

As another example, the network information does not provide all information required for the subscription ordered by for example the user of the user device 120. In such example, the subscription information provides information required for the subscription ordered.

Notably, in some embodiments, the user device 120 may not access the cellular radio network 100 until the subscription information is received. In such embodiment, the subscription information may be received via WLAN or the like as explained herein. See action 607.

As an example, the network information may be basic subscription information with limited validity and/or limited functionality. In other words, the basic subscription information is basic in that the validity and/or functionality thereof is/are limited. For example, the basic subscription information may be limited to only voice calls, allow or not allow roaming, a maximum up/downlink rate and/or a maximum number of bytes per month (or day etc). Moreover, only a limited number of minutes for the voice calls may be available. The network information enables the user device 120 to connect to the first network node 130, such as an operator providing subscriptions to be used by end-users. Thereby, infrastructure needed for provision of network information and/or subscription information is kept simple.

For example, registration operators according to prior art are not required. Moreover, thanks to that the subscriber identity module 110 need not be provided with any network and/or operator specific information at manufacturing, embodiments herein provide flexible methods for provisioning of network information and/or subscription information. Preferably, the user device 120 connects to the first network node 130 while using the network information. See action 605.

In some embodiments, the received network information is received from a tactile input device, such as a key pad, a keyboard or a touch-screen. As an example, a user of the user device 120 may input the network information into the user device 120 by means of a key pad.

In some embodiments, the tactile input device may be comprised in the user device 120. As an example, the tactile input device may be a key pad built into the user device 120.

In some embodiments, the tactile input device may be external to the user device 120. As an example, the user device 120 may be able to connect to a keyboard while utilizing Bluetooth (BT). This is related to embodiments in which the network information is received as a Bluetooth command. It is also contemplated that a camera or the like may connect to the user device 120 via Bluetooth. See action 602.

In some embodiments, the user device 120 may need a hardware reset in order to put the user device into a special mode, or state, in which the network information and/or the subscription information may be provisioned into the subscriber identity module 110. In this manner, the user device 120 need to perform processing to check whether provisioning of network information and or subscription information is to be performed. In particular, when the user device 120 and the subscriber identity module 110 are to be updated with a new subscription, it may be preferred to allow such update when the user device 120 is put in the special mode.

Action 602

This action corresponds to action 206.

In some embodiments, the received network information is encoded into an image. Then, the user device 120 decodes the image to obtain the network information. The image may comprise at least one of a barcode, a 1-dimensional barcode and a 2-dimensional barcode, such as a Quick Response (QR) code or the like. In some examples, the images may be a three dimensional image, such as a hologram. As an example, the user device 120 may capture the image with a built-in image sensor, such as a camera. In other examples, the image sensor may be connected to the user device 120 while utilizing Bluetooth or another equivalent technology for connection of devices.

In some embodiments, the received network information is encoded into a radio signal. Then, the user device 120 decodes the radio signal to obtain the network information. The radio signal may be a Near Field Communication command, a Bluetooth command or a signal comprising information from a Radio Frequency Identification tag (RFID tag). In addition, the radio signal may be a radio signal in a WLAN. Expressed differently, the radio signal may be received via WLAN.

In some embodiments, the received network information is encoded into a light signal. Then, the user device 120 decodes the light signal to obtain the network information. The light signal may comprise flashes for indicating the network information. In other examples, different wavelengths of light may be used when encoding the network information into the light signal. In some user devices, such as a television set, a fridge, a watch or the like, the light signal may be received by an ambient light sensor. This scenario relates to any user device being equipped with an ambient light sensor or the like. The ambient light sensor may be used for adjusting properties, such as intensity, contrast or the like, of a display comprised in the user device. By use of the ambient light sensor of such user device, network information may be input, such as entered into the user device 120, in a convenient manner. Moreover, the received light signal may be an Infrared (IR) light signal. As an example, a standard according to the Infrared Data Association (IrDA) may be used for the transmission of the IR light signal.

In some embodiments, the received network information is encoded into a combination of two or more of the image, the radio signal, the light signal.

As yet another example, a first portion of the network information may be encoded into an image, a radio signal and/or a light signal and a second portion of the network information may be received from the tactile input device. In this manner, a user of the user device 120 may first input a code or the like on the tactile input device and then use a camera or the like of the user device 120 to read for example a barcode. As a result, the network information is input into the user device 120.

It shall be understood that further examples of combinations for encoding and receiving the network information are contemplated.

Action 603

This action corresponds to action 207.

When the user device 120 has received and in some embodiments also decoded the network information, the user device 120 provisions the network information into the user device 120. As an example, the user device 120 configures and stores the network information in a memory of the user device 120. As an example, the memory is secure in order to prevent unauthorized use of the network information. The memory may be a flash memory, a random access memory or other memory within the user device 120. It may be particularly useful to configure and store the network information on the subscriber identity module 110, i.e. on a memory portion of the subscriber identity module 110. Then, the user device 120 may interact with the subscriber identity module 110 for receiving the subscription information when connecting to the cellular radio network.

Action 604

This action corresponds to action 211.

In some embodiments, the subscriber identity module 110 sends and the user device 120 receives a request for the subscription information. The subscriber identity module 110 may send the request for the subscription information to the first network node 130 managing subscription information via the user device 120.

According to some embodiments, the user device 120 may need to restart, such as reset by powering down and powering up, before requesting the subscription information.

Action 605

This action corresponds to action 212.

In some embodiments, the user device 120 connects to the first network node 130 while using the received network information. In this manner, the user device 120 establishes a connection with the first network node 130. The connection may be performed via the cellular radio network 100, Bluetooth, WLAN or the like. By connecting to the first network node 130, the user device 120 may receive subscription information as is explained with reference to for example action 607. Since range of the cellular network usually is greater than range of BT and/or WLAN, it may in some embodiments be preferred to connect to the first network node 130 via the cellular network 100.

It may be that the key to be used for connecting to the cellular radio network 100 is used for authenticating the connection to the first network node 130. For example, it may be that the key may be used only once, such as to for example prevent fraud.

As mentioned above, the user device 120 may receive the subscription information via any available wireless access technology, such as Wireless Local Area Network (WLAN), Bluetooth, Wireless Fidelity (WiFi) or the like. In such scenario, the received network information enables connection to the first network node 130 such as by providing encryption keys, username or the like, which are needed for access to the first network node 130.

Action 606

This action corresponds to action 213.

In some embodiments, the user device 120 may send and the first network node 130 may receive the request for the subscription information. The request may be sent and received via the cellular radio network 100, WLAN, WiFi, Bluetooth or the like. The request may be implicit, i.e. if the first network node 130 concludes that the network information used for connecting to the first network node 130, see action 605, is used for the first time, the first network node 130 may interpret the connection as an implicit request for subscription information.

Action 607

This action corresponds to action 214.

In some embodiments, the first network node 130 sends and the user device 120 receives the subscription information. The subscription information may be sent and received via the cellular radio network 100, WLAN, WiFi, Bluetooth or the like.

In some embodiments, it may be that from this point and onward encryption keys comprised in the subscription information are used instead of, or in addition to, the encryption keys comprised in the network information.

Action 608

This action corresponds to action 215.

In some embodiments, the user device 120 provisions the subscription information into the subscriber identity module 110. Expressed differently, the user device 120 configures and stores the subscription information in the subscriber identity module 110. In more detail, the subscription information may be stored in the memory portion of the subscriber identity module 110.

Figure 7:
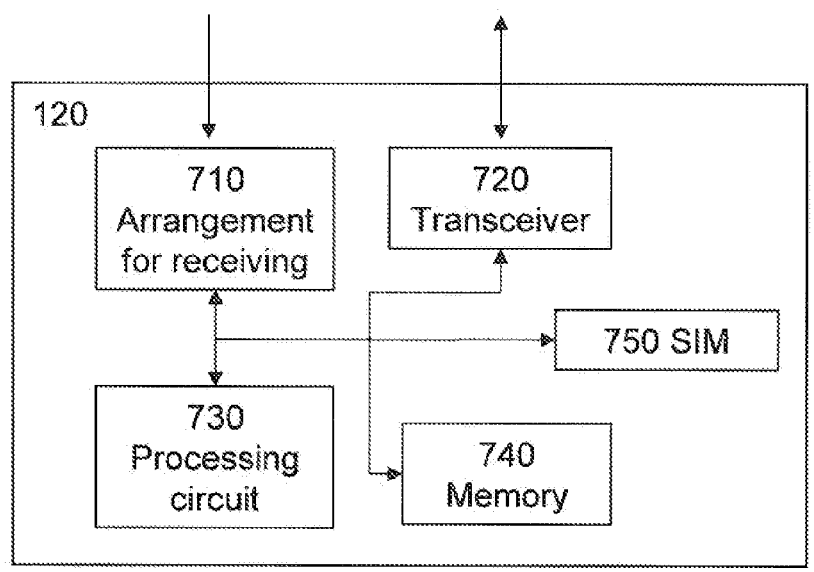
FIG. 7 shows a schematic block diagram of an exemplifying user device configured to perform the methods illustrated in FIG. 6.

With reference to FIG. 7, a schematic block diagram of the user device 120 is shown. The user device 120 is configured to perform the actions above for provisioning of network information into the subscriber identity module 110, 750. As mentioned above, the subscriber identity module 110, 750 is configured to be comprised in the user device 120.

The user device 120 comprises an arrangement 710 configured to receive network information configured into a format selected based on capabilities of the user device 120. As mentioned above, the network information is configured to enable establishment of a connection between the user device 120 and the cellular radio network 100.

According to embodiments, the arrangement 710 may be a light sensor, an image sensor, a camera, an ambient light sensor, a tactile input device, a key pad, a keyboard, a touch screen, a radio signal sensor, an RFID reader, an IR sensor and the like. As an example, the radio signal sensor may be a WLAN/WiFi transceiver, an RFID reader or the like.

The user device 120 comprises a transceiver 720, such as a radio transceiver, configurable for connection to the cellular radio network 100 while using the received network information and/or subscription information.

In some embodiments, the transceiver 720 further is configured to receive a request for the subscription information from the subscriber identity module 110, send the request for the subscription information to the first network node 130 managing subscription information, and receive subscription information from the first network node 130.

The user device 120 comprises a processing circuit 730 configured to provision the network information into the user device 120.

In some embodiments, the processing circuit 730 further is configured to provision the subscription information into the subscriber identity module or the user device 120.

In some embodiments, the format into which the network information is configured is an image and the processing circuit 730 further is configured to decode the image to obtain the network information. The arrangement 710 comprises a light sensor, such as an image sensor or a camera. As an example, the user device 120 may comprise a software module configured to interact with the software running on the subscriber identity module 110 such as to allow the software running on the subscriber identity module 110 to control the camera in order to receive the network information. It may be preferred that the software module(s) is part of the SIM application toolkit. The software module may also execute outside of the SIM, such as in the processing circuit 730 of the user device 120, and interact with the SIM while using any conventional protocol.

In some embodiments, the image comprises at least one of:
a barcode,
a 1-dimensional barcode,
a 2-dimensional barcode,
a QR code, and
the like.

In some embodiments, the format into which the network information is configured is a radio signal and the processing circuit 730 further is configured to decode the radio signal to obtain the network information. The arrangement 710 comprises a radio receiver, such as an RFID reader.

In some embodiments, the radio signal is a Near Field Communication command, a Bluetooth command or information from a RFID tag.

In some embodiments, the format into which the network information is configured is a light signal and the processing circuit 730 further is configured to decode the light signal to obtain the network information. The arrangement 710 comprises a light sensor, such as an ambient light sensor, an image sensor or the like.

The processing circuit 730 may be a processing unit, a processor, an application specific integrated circuit (ASIC), a field-programmable gate array (FPGA) or the like. As an example, a processor, an ASIC, an FPGA or the like may comprise one or more processor kernels.

In some embodiments, the user device 120 may further comprise a memory 740 for storing software to be executed by, for example, the processing circuit. The software may comprise instructions to enable the processing circuit to perform the method in the user device 120 as described above in conjunction with FIG. 6. The memory 740 may be a hard disk, a magnetic storage medium, a portable computer diskette or disc, flash memory, random access memory (RAM) or the like. Furthermore, the memory may be an internal register memory of a processor. In some embodiments, the memory 740 may be used for storing the network information and/or subscription information.

The arrangement, the transceiver, the processing circuit and the memory may be electrically coupled to each other.

In some embodiments of the user device 120, the user device 120 comprises the subscriber identity module 110, which is fixed, such as soldered, to a chip comprised in the user device 120.

In some embodiments of the user device 120, the network information comprises one or more of:

a value for identification of International Mobile Subscriber Identity, IMSI, a name of an operator managing the cellular radio network 100, a key to be used for connecting to the cellular radio network 100, a network identifier for identifying the cellular radio network 100, and the like.

Figure 8:
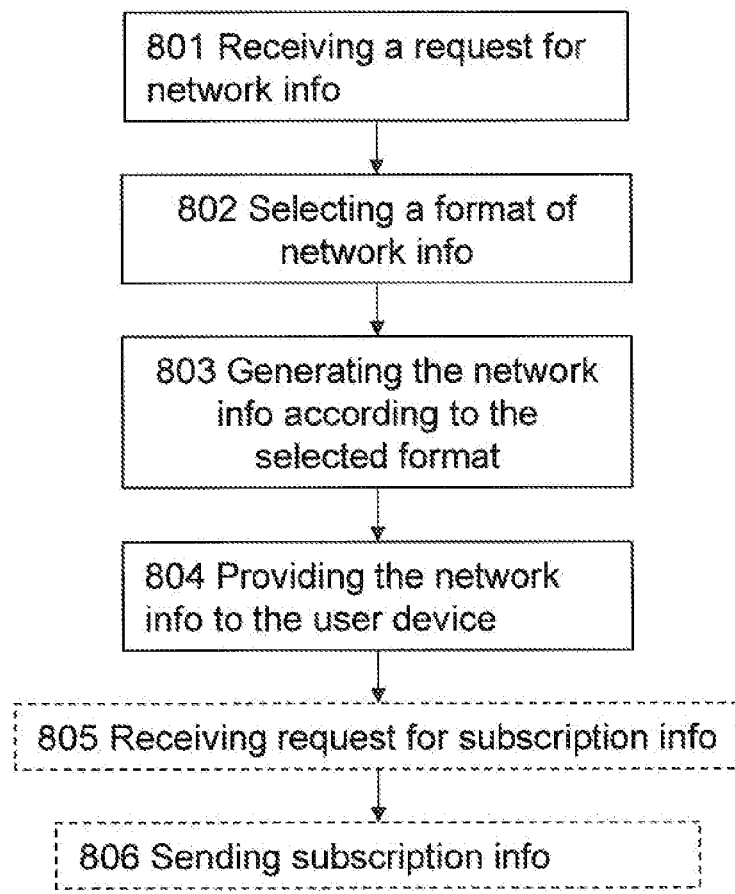
FIG. 8 shows a schematic flow chart of the methods of FIG. 2 when seen from the first network node.

In FIG. 8, an exemplifying, schematic flow chart of the methods of FIG. 2 when seen from the first network node 130 is shown. As mentioned above, the first network node 130 may perform a method for managing network information.

The following actions, such as steps, may be performed. Notably, in some embodiments of the methods the order of the actions may differ from what is indicated below.

Action 801

This action corresponds to action 201.

The first network node 130 receives a request for network information, denoted network info in the Figure. The request may be received from a second network node 140. The second network node 140 may receive and/or handle an order for a subscription, or requests for network information.

As an example, the second network node 140 may forward the order, i.e. information about the order, received from a form of a browser, an email, a telephone call, a letter or the like. The request comprises information about capabilities of the user device 120 to which the network information is to be applied. Exemplifying capabilities of the user device 120 may be that the user device 120 comprises, or may be connected to, a camera, an RFID reader, a light sensor, a radio signal transceiver adapted for Bluetooth, Near Field Communication (NFC), etc and other arrangements for receiving the network information. The second network node 140 may be any kind of user terminal which may be used for ordering the subscription from the operator of the first network node 130. The user terminal may be a computer, a cellular phone, a phone, a smartphone, a Personal Digital Assistant (PDA) or any other device by means of which a user may order a subscription. In other examples, the second network node 140 may be an automated scanner for scanning a letter comprising the request for network information. When the letter has been scanned, the second network node 140 sends the request to the first network node 130. In other scenarios, the letter may be handled manually and the request for network information is generated based on input from a person handling the letters. In such scenario, the second network node may be a computer, such as a client computer, a personal computer or the like.

Action 802

This action corresponds to action 202.

The first network node 130 selects a format of the network information, denoted network info in the Figure, to be generated, which format is adapted to the capabilities of the user device 120. The network information enables the user device 120 to connect to the first network node 130.

In some examples, the network information relates to the cellular radio network 100. In this manner, the user device 120 may be configured to be able to connect to the cellular radio network 100.

As an example, the selected format may be an image, a radio signal or a light signal depending on the capabilities indicated by the information about capabilities comprised in the request. For example, the capability may indicate that the user device comprises one or more of an image sensor, an RFID reader, a keypad or the like. When the user device 120 comprises an image sensor, such as a camera, it may be preferred that the selected format is an image. Likewise when the user device 120 comprises an RFID reader, it may be preferred that the selected format is a RFID tag, which may generate a specific radio signal comprising the network information.

Action 803

This action corresponds to action 203.

The first network node 130 generates the network information according to the selected format.

As an example, if the selected format is an image, a radio signal and/or a light signal, then the generating of the network information comprises encoding the network information into the image, the radio signal and/or the light signal.

In some embodiments of the method, the generated network information is to be input into the user device 120 via a tactile input device, such as keypad, comprised in the user device 120.

Action 804

This action corresponds to action 204.

The first network node 130 provides the network information to the user device 120.

As an example, the generated network information may be sent in the form of a letter to the user of the user device 120. The letter may comprise a sticker with a barcode, an RFID tag, QR code or the like.

As another example, the generated network information may be sent to a further device. For example, the further device may be a computer. When the further device is a computer, depending on the format of the network information one or more of the following scenarios may be realized.

When the generated network information comprises an image, the image may be printed, or displayed on a screen of the computer, and then the user device 120 may capture the image by means of an image sensor, such as a camera, connected to the user device. As an example, the image sensor may be comprised in the user device 120. When the generated network information is comprised in a Bluetooth command, the Bluetooth command may be sent from, for example, the second network node 140, such as a computer, to the user device via Bluetooth. In other examples, the Bluetooth command or the like is sent from a cellular phone, specified in the order. For example, the cellular phone may be owned by a friend or the like. The Bluetooth command may also be sent from another device that may have received the Bluetooth command via internet or the cellular radio network 100.

Action 805

This action corresponds to action 213.

In some embodiments, the user device 120 may send and the first network node 130 may receive the request for the subscription information. The request may be sent and received via the cellular radio network 100, WLAN, WiFi, Bluetooth or the like. The request may be implicit, i.e. if the first network node 130 concludes that the network information used for connecting to the first network node 130, see action 212, is used for the first time, the first network node 130 may interpret the connection as an implicit request for subscription information.

Action 806

This action corresponds to action 214.

In some embodiments, the first network node 130 sends and the user device 120 receives the subscription information. The subscription information may be sent and received via the cellular radio network 100, WLAN, WiFi, Bluetooth or the like.

In some embodiments, it may be that from this point and onward encryption keys comprised in the subscription information are used instead of, or in addition to, the encryption keys comprised in the network information.

Figure 9:
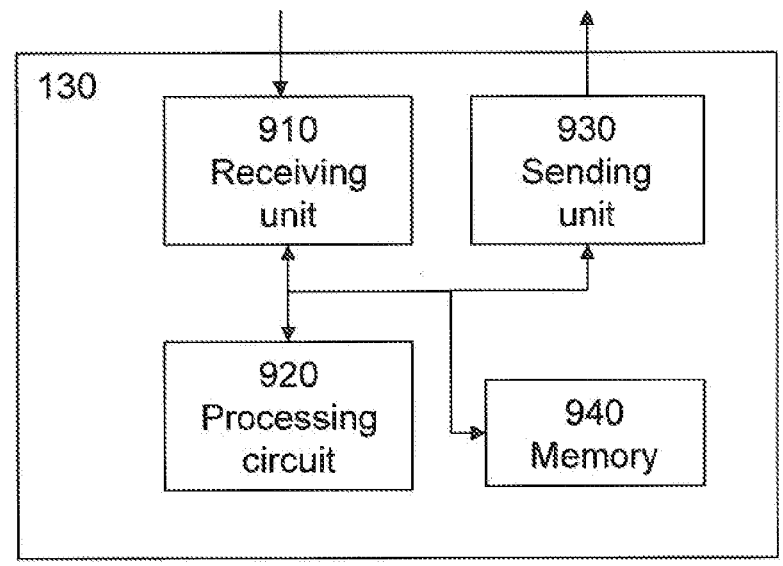
FIG. 9 shows a schematic block diagram of an exemplifying first network node configured to perform the methods illustrated in FIG. 8.

With reference to FIG. 9, a schematic block diagram of the first network node 130 configured to perform the actions above for managing network information is shown.

The first network node 130 comprises a receiving unit 910, such as a receiver, configured to receive a request for the network information from the second network node. As mentioned above, the request comprises information about capabilities of a user device 120 to which the network information is to be applied. The receiving unit 910 may be a receiver, such a software module for handling reception of signals from other network nodes connected to the first network node 130.

In some embodiments, the receiving unit 910 further is configured to receive a request for the subscription information from the user device 120. As an example, the request may be received via the cellular radio network 100, WLAN, Bluetooth or the like.

The first network node 130 comprises a processing circuit 920 configured to select a format of the network information to be generated, which format is adapted to the capabilities of the user device 120. As mentioned above, the network information is configured to enable the user device 120 to establish a connection to the first network node 130. The processing circuit 920 further is configured to generate the network information, and provide the network information to the user device 120.

In some embodiments of the first network node 130, the processing circuit 920 further is configured to encode the network information into an image.

In some embodiments of the first network node 130, the image comprises at least one of:
 a barcode,
 a 1-dimensional barcode,
 a 2-dimensional barcode,
 a QR code, and
 the like.

In some embodiments of the first network node 130, the processing circuit 920 further is configured to encode the network information into a radio signal. The radio signal may be a Near Field Communication command, a Bluetooth command or information from a RFID tag.

In some embodiments of the first network node 130, the processing circuit 920 further is configured to encode the network information into a light signal.

The processing circuit 920 may be a processing unit, a processor, an application specific integrated circuit (ASIC), a field-programmable gate array (FPGA) or the like. As an example, a processor, an ASIC, an FPGA or the like may comprise one or more processor kernels.

In some embodiments, the first network node 130 further comprises a sending unit 930, such as a transmitter, configured to send the subscription information to the user device 120. As an example, the subscription information may be sent via the cellular radio network 100, WLAN, Bluetooth or the like. Similarly to the receiving unit 910, the sending unit 930 may be a transmitter, such as a software module for handling transmission of signals from other network nodes connected to the first network node 130.

In some embodiments, the first network node 130 may further comprise a memory 940 for storing software to be executed by, for example, the processing circuit. The software may comprise instructions to enable the processing circuit to perform the method in the first network node 130 as described above in conjunction with FIG. 7. The memory 940 may be a hard disk, a magnetic storage medium, a portable computer diskette or disc, flash memory, random access memory (RAM) or the like. Furthermore, the memory may be an internal register memory of a processor. The memory 940 may be used for storing the network information and/or the subscription information.

The receiving unit, the processing circuit, the sending unit and the memory may be electrically coupled to each other.

In some embodiments of the first network node 130, the network information comprises one or more of:
 a value for identification of International Mobile Subscriber Identity, IMSI,
 a name of an operator managing the cellular radio network 100,
 a key to be used for connecting to the cellular radio network 100,
 a network identifier for identifying the cellular radio network 100, and
 the like.

In some embodiments of the first network node 130, the network information is configured to be input into the user device via a tactile input device comprised in the user device 120.

Even though embodiments of the various aspects have been described, many different alterations, modifications and the like thereof will become apparent for those skilled in the art. The described embodiments are therefore not intended to limit the scope of the present disclosure.

The invention claimed is:

1. A method in a first network node of a cellular radio network for managing network provisioning information for provisioning into a subscriber identity module of a user device that is not connected to the cellular radio network, the method comprising:
 receiving a request for the network provisioning information from a second network node, the request comprising information about capabilities of the user device that is not connected to the cellular radio network to which the network provisioning information is to be applied, the information about the capabilities of the user device comprising information that the user device is capable of receiving the network provisioning information via one or more of a plurality of modes of communicating information;
 selecting a format of the network provisioning information to be generated, which format is adapted to a mode of communication that is indicated by the capabilities of the user device that is not connected to the cellular radio network that the user device is capable of receiving the network provision information via, wherein the network provisioning information enables the user device that is not connected to the cellular radio network to provision the subscriber identity module of the user device and establish a connection to the cellular radio network;

generating the network provisioning information comprising a value for identification of a subscriber identity according to the selected format; and
providing the network provisioning information to the user device that is not connected to the cellular radio network,
wherein the selecting the format comprises selecting the format from among a plurality of formats including at least one visually communicated format and at least one electrically communicated format.

2. The method of claim 1, further comprising:
managing subscription information comprising one or more encryption keys to connect to the cellular radio network;
after providing the network provisioning information, receiving a request for the subscription information from the user device; and
sending the subscription information comprising the one or more encryption keys to connect to the cellular radio network to the user device.

3. The method of claim 1,
wherein the format of the network provisioning information is an image, and
wherein the generating the network provisioning information comprising the value for identification of the subscriber identity according to the selected format comprises encoding the network provisioning information into the image.

4. The method of claim 3, wherein the image comprises at least one of:
a barcode,
a 1-dimensional barcode,
a 2-dimensional barcode, and/or
a QR code.

5. The method of claim 1,
wherein the format of the network provisioning information is a radio signal, and
wherein the generating the network provisioning information comprising the value for identification of the subscriber identity according to the selected format comprises encoding the network provisioning information into the radio signal.

6. The method of claim 5, wherein the radio signal is a Near Field Communication command, a Bluetooth command or information from a RFID tag.

7. The method of claim 1,
wherein the network provisioning information comprises a value for identification of International Mobile Subscriber Identity, IMSI, and
wherein the user device is not provisioned with an IMSI before receiving the network provisioning information.

8. A first network node of a cellular radio network for managing network provisioning information for provisioning into a subscriber identity module of a user device that is not connected to the cellular radio network, comprising:
a receiving unit configured to receive a request for the network provisioning information from a second network node, the request comprising information about capabilities of the user device that is not connected to the cellular radio network to which the network provisioning information is to be applied, the information about the capabilities of the user device comprising information that the user device is capable of receiving the network provisioning information via one or more of a plurality of modes of communicating information; and a processing circuit configured to select a format of the network provisioning information to be generated, which format is adapted to a mode of communication that is indicated by the capabilities of the user device that is not connected to the cellular radio network that the user device is capable of receiving the network provision information via, wherein the network provisioning information is configured to provision the subscriber identity module of the user device that is not connected to the cellular radio network and enable the user device to establish a connection to the cellular radio network, wherein the processing circuit further is configured to:
generate the network provisioning information comprising a value for identification of a subscriber identity according to the selected format, and
provide the network provisioning information to the user device that is not connected to the cellular radio network,
wherein the processing circuit is configured to select the format by selecting the format from among a plurality of formats including at least one visually communicated format and at least one electrically communicated format.

9. The first network node of claim 8, wherein the receiving unit further is configured to receive a request for subscription information from the user device, the first network node further being configured to manage subscription information comprising one or more encryption keys to connect to the cellular radio network, and wherein the first network node further comprises:
a sending unit configured to send the subscription information comprising the one or more encryption keys to connect to the cellular radio network to the user device.

10. The first network node of claim 8, wherein the format of the network provisioning information is an image and the processing circuit further is configured to encode the network provisioning information into the image.

11. The first network node of claim 10, wherein the image comprises at least one of:
a barcode,
a 1-dimensional barcode,
a 2-dimensional barcode, and/or
a QR code.

12. The first network node of claim 8, wherein the format of the network provisioning information is a radio signal and the processing circuit further is configured to encode the network provisioning information into the radio signal.

13. The first network node of claim 12, wherein the radio signal is a Near Field Communication command, a Bluetooth command or information from a RFID tag.

14. The first network node of claim 8, wherein the format of the network provisioning information is a light signal and the processing circuit further is configured to encode the network provisioning information into the light signal.

15. The first network node of claim 8, wherein the network provisioning information is configured for inputting into the user device via a tactile input device comprised in the user device.

16. The first network node of claim 8, wherein the network provisioning information comprises one or more of:
a value for identification of International Mobile Subscriber Identity, IMSI;
a name of an operator managing the cellular radio network;
an encryption key to be used for connecting to the cellular radio network; and/or a network identifier for identifying the cellular radio network.

17. The first network node of claim 8, wherein the network provisioning information comprises one or more of:
a value for identification of International Mobile Subscriber Identity, IMSI;
a name of an operator managing the cellular radio network; and/or
a network identifier for identifying the cellular radio network.

18. The first network node of claim 9,
wherein the networking provisioning information comprises one or more encryption keys that may be used only once to connect to the cellular radio network, and
wherein the one or more encryption keys of the subscription information replace the one or more encryption keys of the network provisioning information.

19. The method of claim 2,
wherein the networking provisioning information comprises one or more encryption keys that may be used only once to connect to the cellular radio network, and
wherein the one or more encryption keys of the subscription information replace the one or more encryption keys of the network provisioning information.

20. The first network node of claim 8,
wherein the network provisioning information comprises a value for identification of International Mobile Subscriber Identity, IMSI, and
wherein the user device is not provisioned with an IMSI before receiving the network provisioning information.

* * * * *